Figure 1:
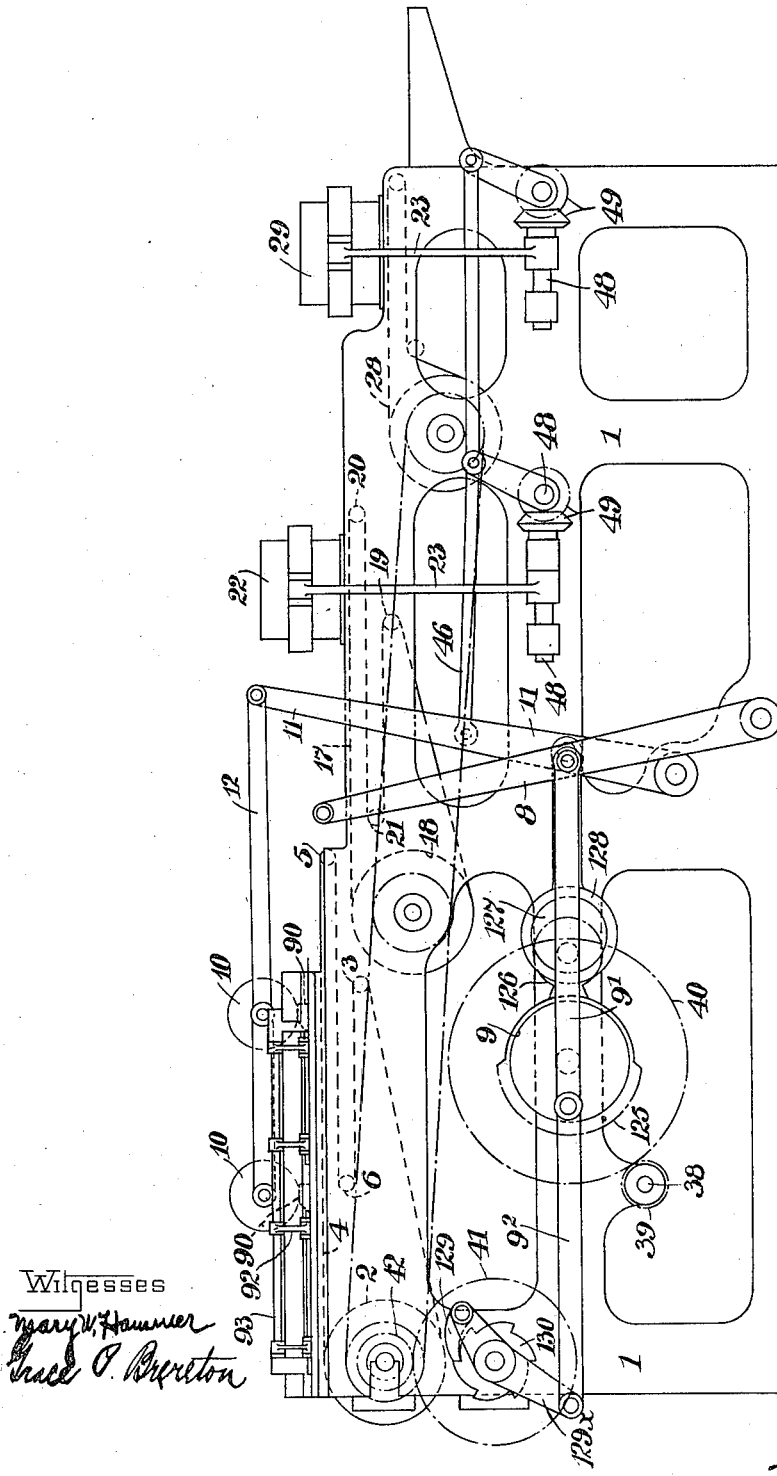

J. & H. L. CALLOW.
MACHINE FOR MOLDING DOUGH PORTIONS INTO LOAVES.
APPLICATION FILED JUNE 24, 1910.

975,932.

Patented Nov. 15, 1910.
5 SHEETS—SHEET 1.

J. & H. L. CALLOW.
MACHINE FOR MOLDING DOUGH PORTIONS INTO LOAVES.
APPLICATION FILED JUNE 24, 1910.
975,932.
Patented Nov. 15, 1910.
5 SHEETS—SHEET 3.
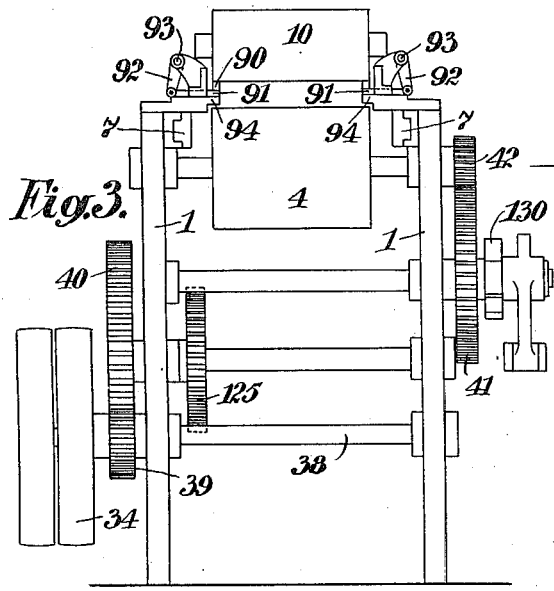
Fig. 3.
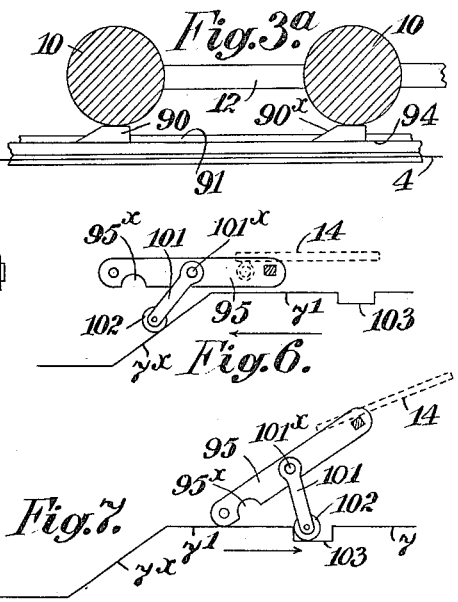
Fig. 3ª
Fig. 6.
Fig. 7.
Fig. 5.
Fig. 5ª
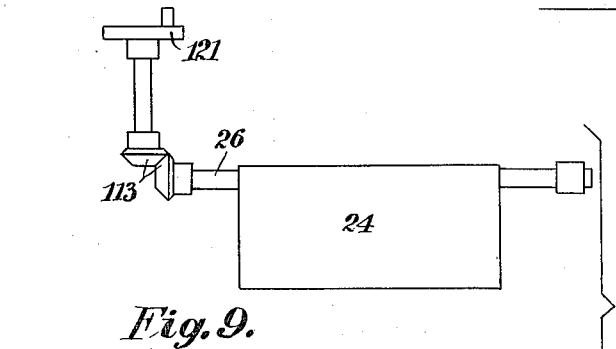
Fig. 9.
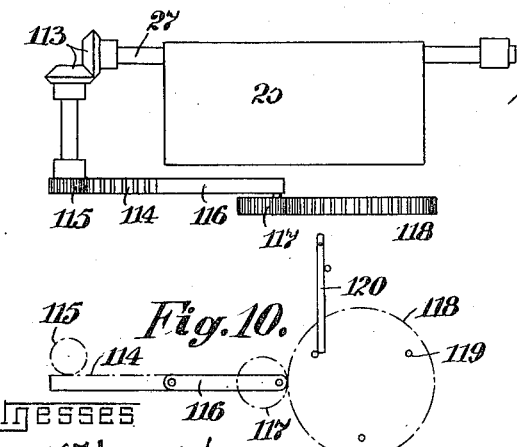
Fig. 10.
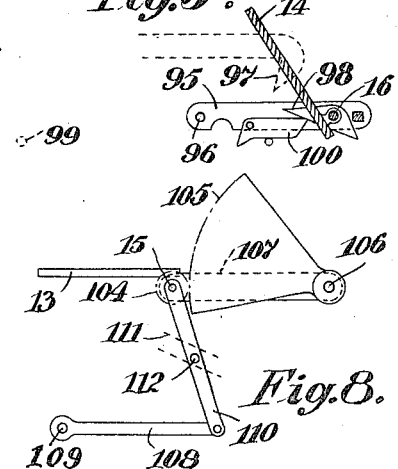
Fig. 8.
Witnesses
Mary W. Hammer
Grace P. Brereton
Inventors
John Callow
Herschel L. Callow
By Sturtevant & Mason
attys J. & H. L. CALLOW.
MACHINE FOR MOLDING DOUGH PORTIONS INTO LOAVES.
APPLICATION FILED JUNE 24, 1910.
975,932.
Patented Nov. 15, 1910.
5 SHEETS—SHEET 4.
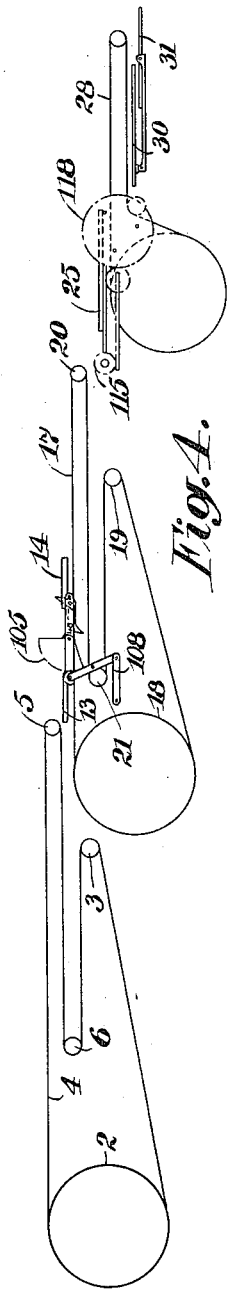
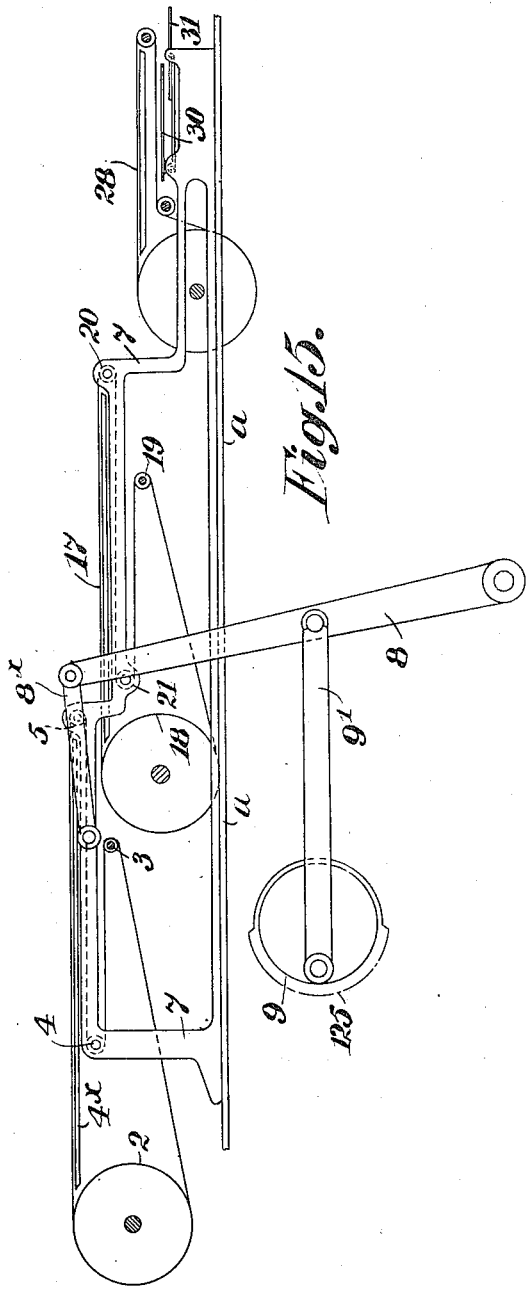

J. & H. L. CALLOW.
MACHINE FOR MOLDING DOUGH PORTIONS INTO LOAVES.
APPLICATION FILED JUNE 24, 1910.

975,932.

Patented Nov. 15, 1910.

5 SHEETS—SHEET 5.

Witnesses
Mary W. Hammer
Grace P. Brereton

Inventors
John Callow
Hirschel L. Callow
By Sturtevant & Mason
Attys.

UNITED STATES PATENT OFFICE.

JOHN CALLOW AND HERSCHEL LIVINGSTONE CALLOW, OF LIVERPOOL, ENGLAND.

MACHINE FOR MOLDING DOUGH PORTIONS INTO LOAVES.

975,932.  Specification of Letters Patent.  Patented Nov. 15, 1910.

Application filed June 24 1910. Serial No. 568,721.

*To all whom it may concern:*

Be it known that we, JOHN CALLOW and HERSCHEL LIVINGSTONE CALLOW, subjects of the King of Great Britain, residing in Liverpool, in the county of Lancaster, in the Kingdom of England, have invented certain new and useful Improvements in Machines for Molding Dough Portions into Loaves, of which the following is a specification.

The present invention relates to the molding of dough, and forming it into loaves in an expeditious and cleanly manner.

The dough portions in the making of certain types of loaves, are molded from a sheet or slab, and machines have been suggested for doing this so as to avoid hand manipulation.

The object of the present invention is to produce an improved machine which will flatten the dough into slabs, deposit the slabs on mechanically operated folding tools at the right place and at the proper moment to be operated upon thereby, then after folding, the folded slabs are mechanically compressed or rolled, then deposited in connection with another pair of mechanically operated folding tools by which they are doubled or folded a second time, then again compressed and folded, these operations being performed in sequence as many times as required with intermittent movements imparted to the said dough portions, and finally the molded pieces are carried to a mechanically operated final folding tool, which folds and welds them into a shape approximating to the shape of the loaf required.

We may here mention that it is not broadly new to successively sheet and fold dough for a series of mechanical sheeting and folding operations performed in sequence, but the specific object of our invention is to provide a machine wherein the sheeting and folding and the forming of the dough portions into their final shape, together with the advancing of the dough from the sheeting devices to the folders and from the folders to the sheeting devices, are accomplished in an improved and more efficient manner.

Our invention contains many advantageous features, which will be apparent from the matter herein set forth and which will be appreciated by those skilled in the art, and understanding the conditions of practical use.

The invention will be understood from the following description, reference being had to the accompanying drawings in which:—

Figure 2:
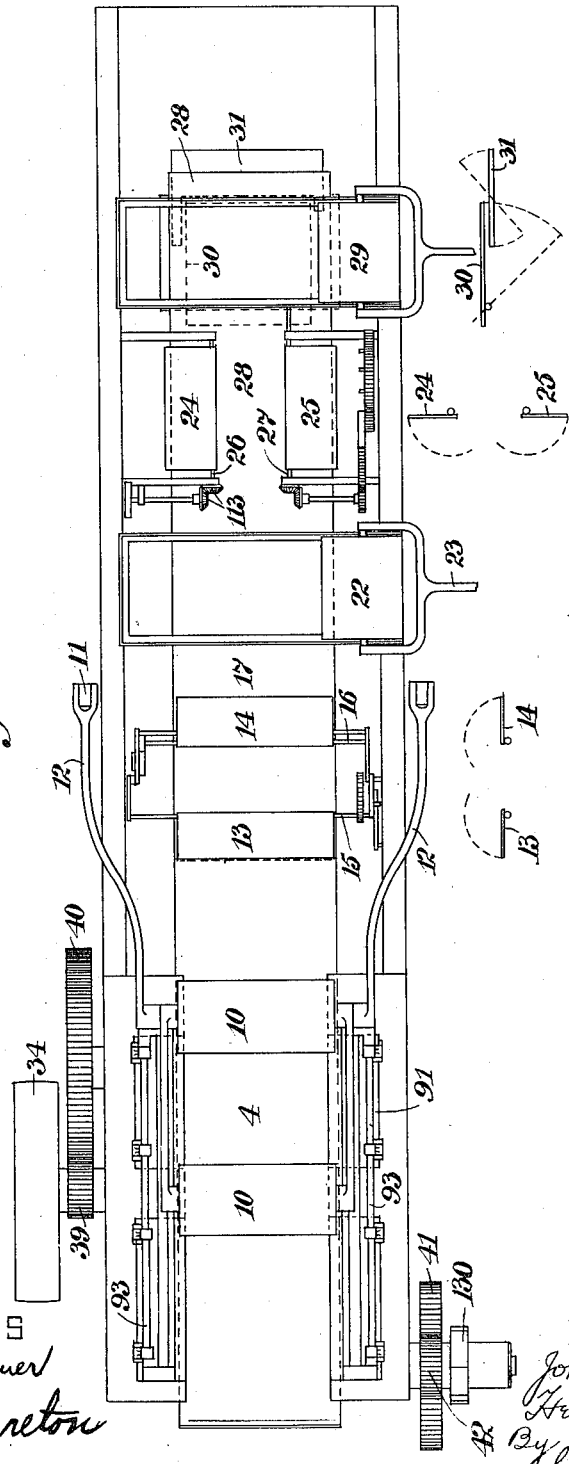
Figure 11:
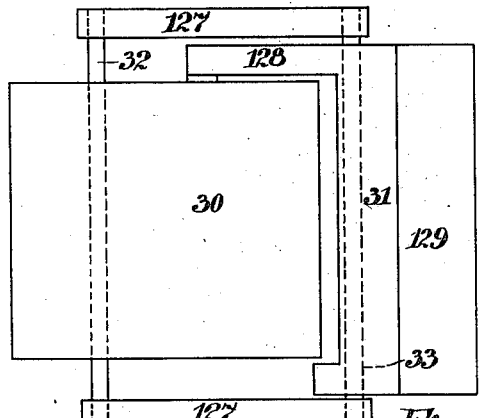
Figure 12:
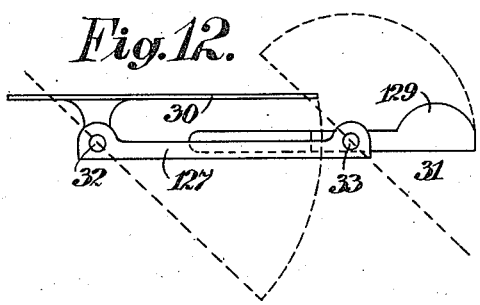
Figure 13:
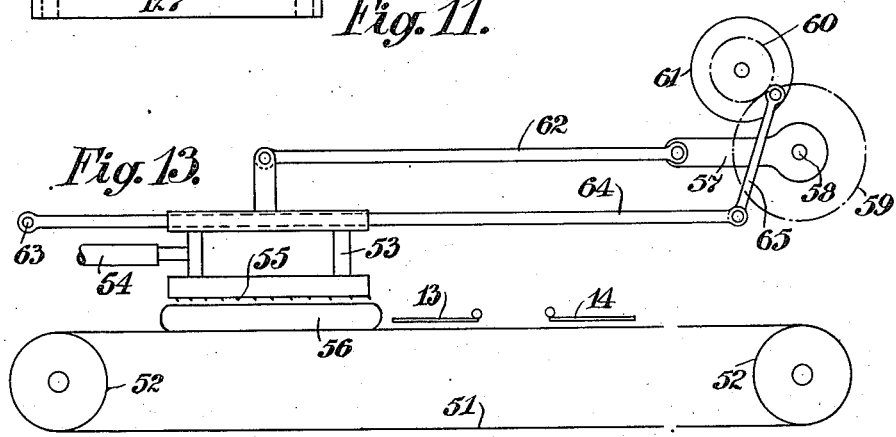
Figure 14:
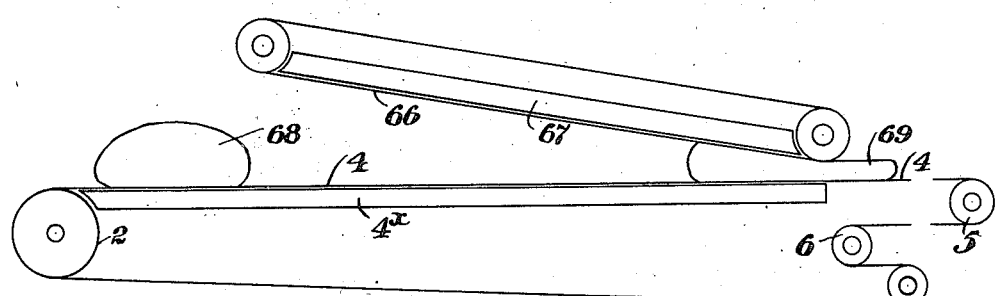

Figure 1 is a side elevation of our apparatus for molding or like treatment of dough; Fig. 2, a plan view thereof with diagrammatic views showing action of the folders; Fig. 3, an end view thereof; Fig. 3$^a$, a detail view of the arrangement for lifting the flattening rollers 10 clear of the carrier 4; Fig. 4, a detail side view of the device for advancing the dough to the folders; Figs. 5, 5$^a$, 6, 7, and 8, detail side views of the first folders; Figs. 9 and 10, detail views of the second folders; Figs. 11 and 12, detail views of the third folders; Fig. 13, a diagrammatic view of the pneumatic device for transferring the dough pieces to the folding devices; Fig. 14, a detail view of an alternative device for pressing the dough before and after folding; Fig. 15, a side view of the yoke 7.

Referring first to Figs. 1 to 4 inclusive, we provide a suitable frame 1 to contain all the fixed or working parts as required. At one end of this frame is mounted a roller 2, and farther on, another roller 3, around which passes an endless band or carrier 4, on which the pieces of dough are fed to a fence at the receiving end of the machine, for the purpose of distancing them on the carrier so that they shall be fed forward at uniform intervals, or bringing them into the right position for treatment, when passing through the machine. This fence is provided with an intermittent vertical movement, so as to enable it to rise and fall. The dough pieces are fed up to the fence, and then at the proper moment the fence rises, and the carrier carries the dough pieces forward. The said two carrier rollers 2 and 3 being journaled in the frame 1 revolve in a uniform position, one of these rolls i. e. 2 being the driver, and driven by gear so as to effect a positive and intermittent drive without liability of slip. In addition to these two rolls, 2 and 3, we provide two guide rolls 5 and 6, around which a bight of the endless band 4 passes. These rolls 5 and 6 are journaled in a sliding yoke or frame 7, a part of which is shown in Fig. 3, but which is omitted from Fig. 1 to avoid undue complication of parts. It is however shown separately in side view in Fig. 15. This yoke 7 is reciprocated in guides $a$, in a plane parallel to the plane of the conveyer 4. Any suitable mechanism can be provided for setting up this reciprocation, such as a crank disk 9 operating an oscillating lever 8, which is coupled by a connecting rod 8× to the yoke or frame 7. The endless carrier passes from the driver roll 2 journaled in the frame 1 to the upper roll 5 of the yoke 7, passes part way around it, and then part way around the lower roll 6 of the yoke 7 the opposite way, and from thence to the guide roll 3 journaled in the frame 1, and so back to the driver roll 2. In passing around the rolls of the yoke, the carrier 4 becomes deflected into a different plane, and the part between the rolls 5 and 6 is what we may term the bight of the carrier. After the pieces of dough pass the fence (by which they are timed or distanced), they are carried by the carrier under the pressure rollers 10 which have a revolving and traveling movement longitudinally of the carrier 4.

The traveling or rolling motion can be set up by an oscillating lever 11 coupled to the rollers 10 by a connecting rod 12. These rollers 10 are for the purpose of evenly rolling flattening and extending the dough lumps into slabs or sheets, exuding the excess of gas that the dough may contain, also compressing the occluded gas. The flattened lumps are now carried forward by the intermittent traversing motion of the carrier 4, but so long as the yoke rolls 5 and 6 reciprocate in the same direction in which the carrier 4 is traveling, the dough lumps will remain in about the same positions relative to the yoke rolls 5 and 6, i. e. the rolls 5 and 6 advance the bight of the carrier, at the same speed as the carrier is traveling and consequently the dough pieces do not approach any nearer the end of the bight. When however these yoke rolls 5 and 6 reach the end of their forward reciprocation, they begin their return reciprocation in the opposite direction. Consequently a dough lump (having been brought up to the end or near the end of the bight of the carrier by its forward travel and properly timed by the fence), falls off the end of the carrier 4 on to mechanically operated folding tools, 13 and 14, by reason of the reciprocating back of the bight by the yoke rolls 5 and 6. It will be seen therefore that the object of the carrier arranged in the manner described, is to advance the dough, then withdraw the bight of the carrier so as to deposit the dough at the right place and at the proper moment to be operated on by the folders. 17 is a second carrier below the folders 13 and 14. This second carrier 17 is arranged in precisely the same way as the first carrier, except that it is on a lower plane, there being a roller 18 journaled in the frame 1, and farther on another roller 19 journaled in frame 1 around which passes the endless band or carrier 17, said rollers revolving in a uniform position. The two guide rolls 20 and 21 around which the bight of the carrier passes are journaled in the same yoke 7, in which the guide rolls 5 and 6 of the first carrier are journaled, so that they are reciprocated back and forth, the reciprocation being effected by the reciprocating lever 8. This carrier 17 may be succeeded by another carrier 28, and so on, as many as required, each on a lower level to the preceding one. The last carrier 28 of the series, is not provided with yoke rolls, and consequently it has no bight which is advanced and retracted, but travels in a uniform position. After the yoke rolls 5 and 6 have reciprocated in a backward direction, and before they commence their advancing reciprocation, the mechanically operated folding tools 13 and 14 are doing their work. These folding tools consist of two flat plates or frames turning on pivots 15 and 16, in the arcs of circles, so as to bring together the two opposite sides or ends of the flattened dough and fold them on to the center portion, which lies upon the second carrier. They not only have a turning movement on pivots 15 and 16, but folder 14 also rises at intervals clear of the folded dough, so as to leave the folded dough free to be carried forward. The folded dough is carried forward from the folding tools by the second carrier 17, and the union of the folded parts and the extension and flattening of the mass effected by a pressing roller 22, and the folds in the dough pieces are welded together thereby, so as to form a homogeneous mass. This pressing roller 22 is reciprocated transversely to the travel of the dough pieces by a connecting rod 23. The dough pieces thus welded and flattened are delivered by the second carrier 17 on to a third carrier on or immediately above which are a second pair of folding tools which consist also of two flat plates 24 and 25 turning on pivots 26 and 27, these flaps being arranged to fold the dough crosswise or at a right angle or thereabout to the previous folding. The folded dough pieces are again carried forward by the third carrier such as 28, to another pressing device 29, which effects a union of the folded parts and an extension and flattening of the mass. These operations are repeated again and again as often as required, until the dough mass is sufficiently welded and compacted together, the excess of gas squeezed out and the occluded gases compressed.

30 and 31 are a pair of final mechanically operated folding tools, turning on pivots 32 and 33 which give a final fold to each dough piece. These folders are adapted to reciprocate toward and away from the last mentioned carrier 28, so as to alternately receive a dough piece, then travel away therefrom, then the folder 31 folds the flattened dough portion on to the other folder 30 and presses it, and then the said folder 30 is liberated and discharges the dough on to a delivery belt or elsewhere. Finally, the folders reciprocate to receive another dough piece. This final molding tool brings the two edges of the folded dough together and welds the folds to form a shape approximating the shape of the loaf required. The final folding tools are shown in detail in Figs. 11 and 12, which are respectively a plan view and a side view. In these 127 is the frame fastened to the yoke 7. To this frame 127 the tools 30 and 31 are pivoted, and the yoke 7 reciprocates the frame 127 and the tools toward and under the carrier 28 and away from the same. The front edge of the dough piece is delivered by the carrier 28 on to the folder 31, and as the folders move outward, the rear portion of the dough piece is discharged on to the folder 30. The weight of the front end of the dough piece, tips the rear arm 128 of the folder 31 against the under side of the folder 30, and so supports it for a time, but when the delivery is complete, the weight of the dough piece on the folder 30 overcomes the sustaining force of the arm 128, and so that folder 31 is tilted quickly and folds the leading end of the dough portion on the folder 31 against the rear portion of the dough on the folder 30, so that when the completion of the fold takes place, the two folders lie in a diagonal position shown by the dotted lines, Fig. 12, and the part 129 presses the two opposite edges of the folded dough together. In this position the folded dough easily falls off by gravity to a delivery carrier, and the folders 30 and 31 are turned back to their initial position by any suitable gear.

The carriers 4 travel intermittently, and the falling off of the dough lumps on to the folding tools is effected simply by the moving back of the bight of the carriers by the yoke rolls 5, 6, 20, 21, when the carriers are stationary or not traveling, or by the combined action of the reciprocating back of the said rolls and of the traveling forward of the carriers around the rolls.

At the feeding end of the machine the reciprocating rollers 10 are raised, and rest upon bearers 90 when the carrier 4 is traversing the dough pieces forward, so as to form no obstruction thereto. When this has been accomplished, the rolls 10 are operated, then roll down an incline 90$^x$ on to a pair of side plates or wings 91 mounted upon the framework 1. The rolls 10 travel along these side plates 91, and roll the succeeding dough piece to a certain thickness. 4$^x$ is a backing against which the upper run of the carrier 4 rests. The said plates 91 however are arranged to have a lateral motion away from each other, at stated intervals, the object being to enable them to clear the rolls 10 on the return reciprocation of the latter, and so enable the said rolls 10 on their said return reciprocation to further flatten out the dough, and make it still thinner. These side wings 91 are operated by levers 92 (Figs. 1 and 3) mounted upon an oscillating shaft 93. The motion is imparted to said shaft by any suitable means. Consequently the side plates 91 are alternately given a lateral movement toward one another to form a first track for the rollers 10, and then away from one another to enable the rolls to travel upon a track 94 on a lower level, and so the dough is gradually rolled out.

All the working parts of the machine are connected through a series of gearing so as to be driven from a single prime mover, such as a driving pulley 34 which together with a loose pulley is mounted upon the driving shaft 38 supported by bearings in the frame. This shaft gives motion by gears 39 and 40 to the mutilated gear wheel 125 which gives motion to the mutilated wheel 126. On the same shaft as the wheel 126 is the eccentric sheave 127 whose strap and rod 128 is coupled to the lever 11 that reciprocates the flattening rollers 10. The mutilated wheel 125 also forms a crank disk 9 and oscillates the lever 8 by means of the connecting rod 9′, and so gives motion to the yoke 7 which carries the yoke rollers 5, 6 etc. The said crank disk 9 also operates a wheel 41 by means of a connecting rod 92, lever 129$^x$, pawl 129 and ratchet wheel 130, which wheel 41 gives motion through a pinion 42 to the driving roller 2 of the carrier 4 and by means of chains or gear to the rollers of the other carriers. The said crank lever 11 also oscillates levers 46 which through shafts 48 and miter wheels 49 operate the second and third rollers or pressers 22 and 29, and so on. All the elements having one prime mover in common have their movements timed and proportioned one to the other, so as to act in harmony.

Instead of having a series of separate carriers the apparatus could be arranged with a single endless carrier having a series of bights at intervals passing around reciprocating rollers, in which case of course there would be a guide roll at each end of the machine, revolving in a uniform position, while at intervals between these two rolls are arranged the series of pairs of guide rolls journaled in the yokes.

Instead of the rolls reciprocating back and forth with the bight of the carrier in such manner as to advance and withdraw a bight of the carrier and cause the lumps to be delivered on to the folding device, we can provide an ordinary carrier mounted on rolls which do not slide back and forth, but which revolve at a uniform distance apart. In this case the folding tools may be arranged to reciprocate alternately toward and under, and away from the delivery end of the carriers, so as to alternately receive the delivery from the carrier and then travel clear thereof to effect the folding operation. Or, instead of the folders having a reciprocating movement toward or away from the carrier, this reciprocating movement may be avoided by transferring the dough lumps from the carrier to the folding tools by an automatic taker off, embodying a framework of parallel tapes or bars, turning on one end as a center. In such case the carriers along which the dough pieces pass, will embody a series of bands or tapes passing along between the bars or tapes of the taker off. When the dough lumps have reached to the required position, the taker-off makes a rapid turn on its center, raises the dough sheet or lumps off the carrier, and lays them down on the folding devices, where they undergo a folding and pressing, and then quickly returns ready to transfer the next sheet or lump or set of lumps. Or the transferring movement may be effected by pneumatic devices adapted by means of suction to lay hold of the dough lumps and transfer them to the folders, then release the suction, and return ready to transfer the next lump or set of lumps. This is shown in Fig. 13, in which 51 is the endless carrier mounted on rolls 52 revolving in a uniform position, and 53 a box having a perforated bottom, and having a tube 54 which (by means of a pump) exhausts air from the box 53 and produces a suction through the perforations, so that the box will lay hold of the dough 56 and lift it. These perforations are shown diagrammatically at 55.

57 is a crank arm mounted on the shaft 58, on which shaft is also mounted the gear wheel 59, into which gears the pinion 60 keyed to a shaft, which also carries the crank disk 61. The pinion 60 makes two revolutions to each revolution of wheel 59. 62 is a connecting rod freely coupled at one end to the crank 57, and at the other end coupled to the suction box 53. On a fixed pin 63 is secured the slide rod 64, whose outer end is coupled to a connecting rod 65 pivoted to the crank disk 61. On this slide rod 64 moves backward and forward the suction box 53. The disk 61 with slide rod 64 raises and lowers the suction box, while 58, 57 and 62 slide it along. Hence, if the crank disk 61 be revolved, it raises the slide rod 64, which lifts the suction box 53 together with a dough lump 56, and at the same time turns by means of the gear wheels the crank 57. This crank 57 pulls the suction box 53, together with its dough lump 56 longitudinally, and by the time it has made half a revolution it has brought the dough lump immediately above the folders 13 and 14. The disk 61 has meantime made a complete revolution, and lowers the dough lump on to the folders 13 and 14. The suction is cut off, another turn of the disk 61 raises and lowers the box 53, and simultaneously the remaining half turn of the crank 57 oscillates back the connecting rod 62 and the suction box 53 into the box's former position, ready to lay hold of the next dough lump or set of lumps.

Instead of using rollers for rolling and compressing the dough lumps, we may press the dough before and after folding between moving surfaces, see Fig. 14. This may consist of an endless band or carrier 4, and a backing 4$^x$ against which the carrier 4 rests, and which supports the carrier for a great part of its length. 66 is another carrier passing around rollers revolving in a uniform position, but set at an angle relative to the carrier 4, so that the two carriers 4 and 66 converge toward one another at one end, and the space between the surfaces is of gradually decreasing area.

67 is a backing against which the opposing length of the carrier 66 rests, the object of these backings being to resist sagging of the carriers when pressing the dough. The dough portions 68 fed in at one end between these moving converging carriers 4 and 66 are pressed and extended between their moving surfaces, this compressing and extending action being a progressive one, so that the mass is reduced gradually to the required thickness, and it issues in a flattened form 69 at the delivery end, and is acted upon by the mechanically operated folding tools. The opposing surfaces of the two carriers 4 and 66 travel in the same direction and at the same rate. They may also have a movement toward each other for the purpose of pressing the dough.

Instead of carrying the dough forward after flattening and folding to another flattening device and folding device, the dough can be treated by the same folding device as many times as required, that is to say, it can be treated by the same flattening and folding devices alternately, in such a manner that first two opposite sides of the dough are folded toward one another and flattened, and then the other two sides are folded and flattened at right angles to the first fold, and so on. In such case the carrier 4 delivers the dough slab on to a tray, and the folders fold the two opposite sides of the dough slab toward one another, on to the part of the slab that rests on the tray. Then the flattening of the folded dough takes place by means of a roller or otherwise, and when this has been accomplished the tray turns or oscillates through an angle of 90 degrees, so as to turn the folded slab of dough a quarter of a turn. The folders now again operate so as to fold the two other sides of the dough toward one another at right angles to the first fold, and the flattening tool again operates so as to effectually unite the folded parts of the dough.

Turning now to the mechanically operated folders 13 and 14 we will describe an arrangement for operating the same, reference being had to Figs. 5, 6 and 7. The folder 14 turns on the pivot 16 which is mounted in a crank lever 95 turning on a fixed pivot 96. In order to fold over one edge of the dough piece, we provide a catch 97 pivoted on the yoke 7 which carries the carrier rolls so as to reciprocate longitudinally with the yoke, and 98 is a tooth fixed on the pivotal pin 16 of the folder 14 against which the catch 97 engages when the yoke moves toward the left, and so turns the folder 14 in the arc of a circle, and folds over the dough (Fig. 5). In this figure the folder 14 is shown held in a horizontal position by the tooth 98 abutting against one end of the trip lever 100. In order to move the folder back again we provide on the yoke 7 an abutment 99 which when the yoke reciprocates back, engages the point at the end of a trip lever 100, the other end of which contacts with the tooth 98 (Fig. 5ª) and so lifts the trip lever 100 which in turn lifts the tooth 98 and turns the folder 14 back into its former position.

In order to obtain a lifting movement of the folder 14 so as to release the flattened dough portion and permit it to travel forward, we provide a lever 101 pivoted at one end to the crank arm 95, and at the other end provided with an antifriction roller 102. At one part the yoke 7 aforesaid has a trackway 7' along which the roller 102 travels, and at one place this trackway has an inclined plane 7ˣ and at another part a little groove 103 which under certain circumstances acts as a scotch to the antifriction roller 102. Consequently, as the yoke 7 moves toward the left, the antifriction roller will run up the incline 7ˣ, enter the groove 95ˣ, and run along the higher plane of the trackway 7, and the cut out passes it, without acting as a scotch. On the return movement of the trackway 7, i. e. toward the right, the cut out 103 scotches or holds the antifriction roller 102 thereby turning the pivoted lever 101 on its pivot 101ˣ and so lifts the crank lever 95 with the folder 14 into the position shown in Fig. 7, and then lowers it, the end of the lever being brought into the opposite position to what it was before. This action gives a momentary lift to the folder 14. As the roller 102 travels down the inclined plane 7ˣ, the lever 101 falls, so that on the movement of the yoke being again reversed the lever 101 comes into the position shown in Fig. 6. The other folder 13 of the pair, which turns on the pivot 15, is provided on said pivot with a pinion 104 (Fig. 8) which gears with the quadrant 105 fixed on a spindle 106 fastened to the main frame, so that it will not turn. The pinion 104 is coupled to this spindle 106 by the radius arm 107. 108 is a second radius arm turning on a fulcrum 109, and the end of this arm 108 is coupled by a connecting rod 110 to the pivot 15 of the folder 13. In the aforesaid yoke 7 there is a guide-way having at one place an inclined plane 111, and in this guide-way slides a runner 112 mounted on the rod 110, so that as the yoke 7 moves one way, this runner sliding in the guide-way 111 will act to lift the pinion 104, which, being in mesh with the stationary quadrant 105 rotates, and so imparts a half turn to the folder 13. The movement of the yoke in the other direction has of course an opposite turning effect on the folder 13.

With regard to the folders 24 and 25, their folding movement is effected by the arrangement shown in Figs. 9 and 10. These folders which are pivoted on the spindles 26 and 27 have an oscillating movement imparted to them by the gears. The folder 25 is operated by the gear 113, by means of the rack 114 gearing into the pinion 115. This rack is reciprocated by a connecting rod 116 coupled to the crank disk 117, which disk also has teeth on its periphery gearing with the wheel 118, on which are pins 119. 120 is a pawl pivoted to the yoke 7 aforesaid, so that as the yoke is moving in one direction it engages these pins, and so turns the wheel 118, which through the gearing mentioned, turns the folder 25 for half a revolution in the arc of a circle, and then instantly turns it back again. During the reverse movement of the yoke, no action takes place owing to the pawl 120 slipping over the pins 119. The oscillating spindle 26 of the folder 24 is operated by the gears 113 and crank disk 121, which is worked by a catch plate on the sliding frame 7, so as to give a movement to the folder 24 which is slower than the movement of the folder 25 the object being that the folder 25 shall complete its fold, before the folder 24 does.

We declare that what we claim is:—

1. An apparatus for molding dough, including in combination intermittently operated means for conveying the dough portions, a roll located above the conveying means, means for operating said roll, means for lowering said rolls into engagement with the dough portions, whereby the same are pressed and flattened, and means for raising the said roll, out of engagement with the dough portions, to permit the advancement of the same, and pivoted folding and pressing members for shaping the dough portions into loaves.

2. An apparatus for molding dough, including in combination an intermittently operated conveyer for receiving and discharging dough portions, rolls for flattening the dough portions while on said conveyer, means for operating said rolls, means for raising and lowering said rolls to allow the dough portions to be advanced, a second conveyer receiving the dough portions from said first conveyer, means for varying the position of the delivering end of said first conveyer, for discharging the dough portions on to the second conveyer, and a flattening roll operating transversely of said second conveyer and engaging the dough portion on the second conveyer, for flattening the same.

3. An apparatus for molding dough including in combination, an intermittently operated conveyer for receiving and discharging dough portions, rolls for flattening the dough portions while on said conveyer, means for operating said rolls, means for raising and lowering said rolls to allow the dough portions to be advanced, a second conveyer receiving the dough portions from said first conveyer, means for varying the position of the delivering end of said first conveyer for discharging the dough portions on to the second conveyer, and a flattening roll engaging the dough portion on the second conveyer for flattening the same, pivoted folding and pressing members for folding dough portions, said pressing members being located between the flattening rolls.

4. An apparatus for molding dough including in combination, an endless conveyer, flattening rolls for engaging the dough portions on said conveyer, a second conveyer located in a plane below said first named conveyer on which said first named conveyer discharges the dough portions, folding members for engaging the dough portions as they are discharged from the first conveyer, a second flattening roll for engaging the dough portions on said second conveyer, said second flattening roll moving in a direction transversely of the conveyer, a second set of folding and pressing members for receiving and folding the dough portions from said second conveyer, said second set of folding and pressing members being positioned so as to fold the dough in a direction at right angles to the first fold therein, and a third flattening roll for engaging and flattening the dough on the last named conveyer.

5. An apparatus for molding dough including in combination, an endless conveyer, flattening rolls for engaging the dough portions on said conveyer, a second conveyer located in a plane below said first named conveyer on which said first named conveyer discharges the dough portions, folding members for engaging the dough portions as they are discharged from the first conveyer, a second flattening roll for engaging the dough portions on said second conveyer, said second flattening roll moving in a direction transversely of the conveyer, a second set of folding and pressing members for receiving and folding the dough lumps from said second conveyer, said second set of folding and pressing members being positioned so as to fold the dough in a direction at right angles to the first fold therein, and a third flattening roll for engaging and flattening the dough on the last named conveyer, and folding and pressing members for receiving the dough discharged from the last named conveyer.

6. An apparatus for folding dough including in combination, a plurality of endless carriers positioned so that one carrier delivers on to the next adjacent carrier, folding members operating about axes extending longitudinally of said carrier, folding members located at the delivery end of the last carrier and operating about axes extending transversely of the carrier, means for reciprocating said last named folding members underneath the delivery end of the carrier, whereby the dough portions may be discharged onto the folding members, and for moving said folding members away from the carrier, to allow the folding members to fold the dough, and a roller moving transversely of the carrier and intermediate the sets of folding members, for flattening the folded dough portions.

In witness whereof, we have hereunto signed our names in the presence of two subscribing witnesses.

JOHN CALLOW.
HERSCHEL LIVINGSTONE CALLOW.

Witnesses as to John Callow:
  WM. FIERU,
  F. McCORMICK.

Witnesses as to Herschel Livingstone Callow:
  R. WILSON,
  H. D. JAMESON.